United States Patent
Poirier et al.

(10) Patent No.: US 7,028,404 B1
(45) Date of Patent: Apr. 18, 2006

(54) APPARATUS AND METHOD OF MANUFACTURING A VEHICLE FRAME ASSEMBLY

(75) Inventors: Jason A. Poirier, Birdsboro, PA (US); Richard A. Marando, Mohrsville, PA (US)

(73) Assignee: Dana Corporation, Toledo, OH (US)

(*) Notice: Subject to any disclaimer, the term of this patent is extended or adjusted under 35 U.S.C. 154(b) by 0 days.

(21) Appl. No.: 09/392,270

(22) Filed: Sep. 9, 1999

(51) Int. Cl.
*B21D 53/88* (2006.01)

(52) U.S. Cl. ..................... 29/897.2; 219/610

(58) Field of Classification Search ........ 29/897.2, 29/897, 897.3; 219/610, 59.1, 617, 611, 219/603; 148/567, 516
See application file for complete search history.

(56) References Cited

U.S. PATENT DOCUMENTS

| | | | |
|---|---|---|---|
| 2,676,233 A | | 4/1954 | Foxx |
| 3,258,573 A | | 6/1966 | Morin et al. |
| 3,603,760 A | * | 9/1971 | Khrenov ............ 219/617 |
| 3,856,584 A | | 12/1974 | Cina |
| 4,150,274 A | * | 4/1979 | Minin et al. ......... 219/610 |
| 4,362,578 A | * | 12/1982 | Mills et al. .......... 148/567 |
| 4,766,664 A | | 8/1988 | Benedyk |
| 5,458,393 A | | 10/1995 | Benedyk |
| 5,720,511 A | | 2/1998 | Benedyk |
| 5,794,398 A | * | 8/1998 | Kaehlet et al. ....... 29/897.2 |

FOREIGN PATENT DOCUMENTS

| | | |
|---|---|---|
| EP | 568251 | 11/1993 |
| FR | 2368547 | 5/1978 |
| RU | 758623 | 10/1995 |
| WO | WO 97/10907 | 3/1997 |

OTHER PUBLICATIONS

"Retrogression Heat Treatment Applied To Aluminum Extrusions For Difficult Forming Applications, Part I", Light Metal Age magazine, pp. 8-10, Oct., 1996.
"Retrogression Heat Treatment Applied To Aluminum Extrusion For Difficult Forming Applications, Part II", Light Metal Age magazine, pp. 28-33, Feb., 1997.

* cited by examiner

Primary Examiner—T. Nguyen
(74) Attorney, Agent, or Firm—MacMillan, Sobanski & Todd, LLC

(57) ABSTRACT

An apparatus and method for manufacturing a vehicle frame component allow a preliminary heat treatment process to be performed in a relatively quick and easy manner so as to facilitate the subsequent performance of a bending or other deforming process. Initially, a workpiece that is to be manufactured into the vehicle frame component is provided. The workpiece is preferably a closed channel structural member formed from an aluminum alloy and having a circular or box-shaped cross sectional shape. The workpiece is subjected to a scanning heat treatment process, wherein the workpiece is heat treated in a continuous and longitudinal manner from one end to the other. Preferably, the workpiece is supported vertically during the scanning heat treatment process to prevent the shape thereof from becoming distorted. The scanning heat treatment process is preferably a retrogression heat treatment process, wherein the workpiece is rapidly heated to a sufficient temperature that provides for full or partial softening thereof, followed by relatively rapid cooling. In a third step of the method, a deforming process is performed on the workpiece during the period of time following the retrogression heat treatment process in which the workpiece retains the full or partial softening characteristics. Any desired deforming process may be performed on the workpiece, including hydroforming, magnetic pulse welding, or both.

6 Claims, 4 Drawing Sheets

APPARATUS AND METHOD OF MANUFACTURING A VEHICLE FRAME ASSEMBLY

BACKGROUND OF THE INVENTION

This invention relates in general to the manufacture of structural members having desired shapes, such as components for use in vehicle frame assemblies. More specifically, this invention relates to an improved apparatus and method for initially performing a heat treatment process on a closed channel structural member to facilitate the performance of a subsequent deforming process so as to manufacture a vehicle frame component having a desired shape for use in such a vehicle frame assembly.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the various components of known vehicle body and frame assemblies have been formed from open channel structural members, i.e., structural members that have a non-continuous cross sectional shape (U-shaped or C-shaped channel members, for example). Thus, it is known to use one or more open channel structural members to form the side rails, the cross members, and other components of a vehicle body and frame assembly. However, the use of open channel structural members to form the various components of a vehicle body and frame assemblies has been found to be undesirable for several reasons. First, it is relatively time consuming and expensive to bend portions of such components to conform to a desired final shape, as is commonly necessary. Second, after such bending has been performed, a relatively large number of brackets or other mounting devices must usually be secured to some or all of such components to facilitate the attachment of the various parts of the vehicle to the body and frame assembly. Third, in some instances, it has been found difficult to maintain dimensional stability throughout the length of such components, particularly when two or more components are welded or otherwise secured together.

To address this, it has been proposed to form one or more of the various vehicle % body and frame components from closed channel structural members, i.e., structural members that have a continuous cross sectional shape (tubular or box-shaped channel members, for example). This cross sectional shape is advantageous because it provides strength and rigidity to the vehicle body and frame component. Also, this cross sectional shape is desirable because it provides vertically and horizontally oriented side surfaces that facilitate the attachment of brackets and mounts used to support the various parts of the vehicle to the body and frame assembly. In some instances, the various parts of the vehicle may be directly attached to the vertically and horizontally oriented side surfaces of the vehicle body and frame assembly.

In vehicle body and frame assemblies of the type described above, many of the various vehicle frame components do not extend linearly throughout their entire lengths. As a result, it is usually necessary to bend or otherwise deform portions of the vehicle frame components to achieve these relatively complex shapes. Unfortunately, it has been found to be relatively difficult to bend or otherwise deform closed channel structural members into desired configurations, particularly when the desired configuration contains one or more relatively sharp bends. In the past, a conventional mechanical bending machine, such as a tube bender, has been used to apply sufficient forces to the closed channel structural member as to deform it to a desired angle. However, the amount by which a closed channel structural member may be deformed by a conventional tube bender or similar mechanical bending machine is limited. Excessive bending can result in fracturing or other damage to the closed channel structural member. This is particularly true when the size of the closed channel structural member is relatively large, as is typically found in vehicle frame components. When attempting to form a relatively sharp bend in a relatively large closed channel structural member, excessive compression occurs at the inner bending radius, while excessive stretching occurs at the outer bending radius of the tube. This generally results in undesirable buckling of the closed channel structural member at the inner bending surface and undesirable stretching or fracturing of the closed channel structural member at the outer bending radius.

To address this, it is known that a closed channel structural member can be heat treated prior to the performance of a bending process so as to increase the ductility thereof. Such a heat treatment process can be performed on the closed channel structural member either in whole or in part and can, for example, consist of a retrogression heat treatment process. A retrogression heat treatment process is performed by rapidly heating a closed channel structural member to a sufficient temperature that provides for full or partial softening thereof, followed by relatively rapid cooling. Notwithstanding this cooling, the closed channel structural member retains the full or partial softening characteristics for at least a relatively short period of time. It is during this relatively short period of time that the deforming process can be performed with relative ease. Thereafter, however, as more time passes, the closed channel structural member re-hardens, and such bending becomes more difficult.

It is well known that vehicle frame components are usually manufactured in relatively large quantities. Therefore, to insure optimum efficiency in the manufacturing operation, any process to be performed on a vehicle frame component must be capable of being performed in a relatively quick and efficient manner. Although it is known to perform a retrogression heat treatment process on a vehicle frame component prior to bending the component, as discussed above, such known methods have been found to be undesirably slow in the context of the manufacture of vehicle frame components. Thus, it would be desirable to provide an improved apparatus method for manufacturing a vehicle frame component that allows a preliminary heat treatment process to be performed in a relatively quick and easy manner so as to facilitate the subsequent performance of a bending or other deforming process.

SUMMARY OF THE INVENTION

This invention relates to an improved apparatus and method for manufacturing a vehicle frame component that allows a preliminary heat treatment process to be performed in a relatively quick and easy manner so as to facilitate the subsequent performance of a bending or other deforming process. Initially, a workpiece that is to be manufactured into the vehicle frame component is provided. The workpiece is preferably a closed channel structural member formed from an aluminum alloy and has a circular or box-shaped cross sectional shape. The workpiece is subjected to a scanning heat treatment process, wherein the workpiece is heat treated in a continuous and longitudinal manner from one end to the other. Preferably, the workpiece is supported vertically during the scanning heat treatment process to prevent the shape thereof from becoming distorted. The scanning heat treatment process is preferably a retrogression heat treatment process, wherein the workpiece is rapidly heated to a sufficient temperature that provides for full or partial softening thereof, followed by relatively rapid cooling. In a third step of the method, a deforming process is performed on the workpiece during the period of time following the retrogression heat treatment process in which the workpiece retains the full or partial softening characteristics. Any desired deforming process may be performed on the workpiece, including hydroforming, magnetic pulse welding, or both.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
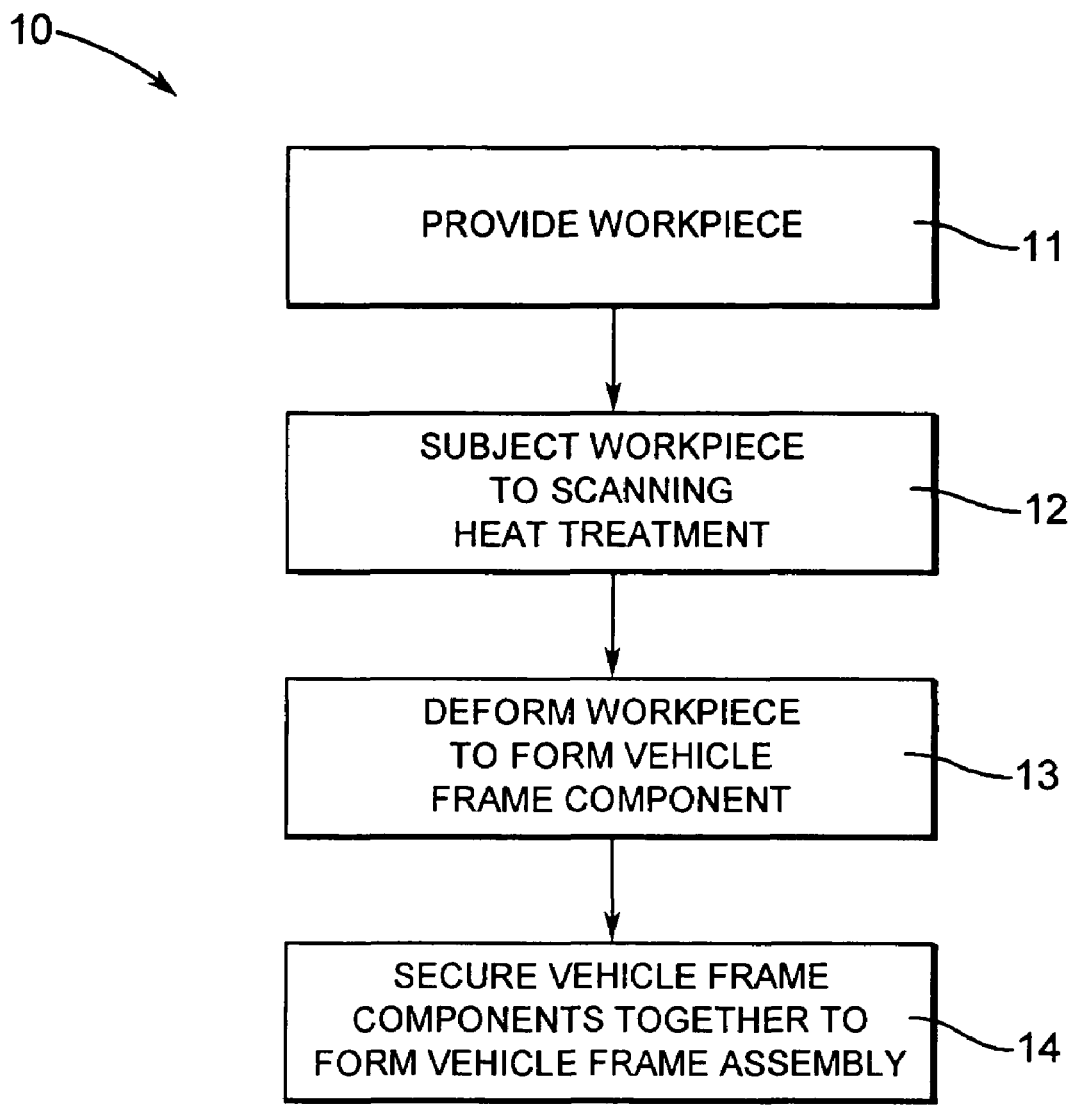
FIG. 1 is a flow chart of a method for manufacturing a vehicle frame assembly in accordance with the method of this invention.

Referring now to the drawings, there is illustrated in FIG. 1 a flow chart of a method, indicated generally at 10, for manufacturing a vehicle frame assembly in accordance with this invention. In a first step 11 of the method 10, a workpiece that is to be manufactured into the vehicle frame component is provided. As will be explained in greater detail below, the workpiece is preferably a closed channel structural member having a circular or box-shaped cross sectional shape. However, the workpiece may be formed having any desired cross sectional shape. The workpiece is preferably formed from a relatively lightweight metallic material, such as aluminum or alloys thereof. However, any desired metallic material may be used to form the workpiece.

In a second step 12 of the method 10, the workpiece is subjected to a scanning heat treatment process. The scanning heat treatment process can be generally characterized as any process for heat treating the workpiece in a continuous and longitudinal manner from one end to the other. This can be accomplished by initially positioning a first end of the workpiece adjacent to a hollow heat treatment mechanism, such as an annular inductor coil. Then, the workpiece is moved longitudinally through the heat treatment mechanism such that it is heat treated in a continuous and longitudinal manner from one end to the other as it passes therethrough. The scanning heat treatment process can be performed in a number of different ways, and the structures of several embodiments of an apparatus for performing such a scanning heat treatment process are discussed in detail below. Preferably, the heat treatment is a retrogression heat treatment process. Generally speaking, the retrogression heat treatment process is performed by rapidly heating the workpiece to a sufficient temperature that provides for full or partial softening thereof, followed by relatively rapid cooling. Notwithstanding this cooling, the workpiece retains the full or partial softening characteristics for at least a relatively short period of time.

The third step 13 of the method 10 involves performing a deforming process on the workpiece. Preferably, this deforming process is performed during the period of time following the retrogression heat treatment process in which the workpiece retains the full or partial softening characteristics. Any desired deforming process may be performed on the workpiece. If, for example, the workpiece is a closed channel structural member, the deforming process may be performed by hydroforming. Hydroforming is a well known process that uses pressurized fluid to deform a closed channel structural member into a desired shape. To accomplish this, the closed channel structural member is initially disposed between two die sections of a hydroforming apparatus that, when closed together, define a die cavity having a desired final shape. Thereafter, the closed channel structural member is filled with a pressurized fluid, typically a relatively incompressible liquid such as water. The pressure of the fluid is increased to a magnitude where the closed channel structural member is expanded or otherwise deformed outwardly into conformance with the die cavity. As a result, the closed channel structural member can be deformed into the desired final shape for the vehicle frame component by the hydroforming process.

The deforming process may alternatively be performed by magnetic pulse forming. Magnetic pulse forming is also a well known process that uses an electromagnetic field to deform a workpiece into a desire shape. To accomplish this, an electromagnetic coil is provided for generating an intense magnetic field about the workpiece. When this occurs, a large pressure is exerted on the workpiece, causing it to be deformed against a support surface. If the electromagnetic coil is disposed about the exterior of the workpiece, then the workpiece is deformed inwardly into engagement with the support surface. If, on the other hand, the electromagnetic coil is disposed within the interior of the workpiece, then the workpiece is deformed outwardly into engagement with the support surface. In either event, the workpiece can be deformed into the desired final shape for the vehicle frame component by the magnetic pulse forming process.

In a final step 14 of the method 10, the vehicle frame component is secured to one or more other vehicle frame components to form a vehicle frame assembly. The securing of such vehicle frame components may be performed in any conventional manner. However, one preferred manner for securing two vehicle frame components together is by magnetic pulse welding. Magnetic pulse welding is a well known process wherein first and second vehicle frame components are initially disposed telescopically within one another. When so disposed, one end of the first vehicle frame component longitudinally overlaps one end of the second vehicle frame component. An electromagnetic coil is provided for generating an intense magnetic field about the overlapping portions of the first and second vehicle frame components. When this occurs, a large pressure is exerted on the first and second vehicle frame components, causing them to move toward one another at a high velocity. If the electromagnetic coil is disposed about the exterior of the two vehicle frame components, then the outer vehicle frame component is deformed inwardly into engagement with the inner vehicle frame component. If, on the other hand, the electromagnetic coil is disposed within the interior of the two vehicle frame components, then the inner vehicle frame component is deformed outwardly into engagement with the outer vehicle frame component. In either event, the high velocity impact of the first and second vehicle frame components, as well as the large pressures exerted thereon, cause the two vehicle frame components to become permanently joined together.

Figure 2:
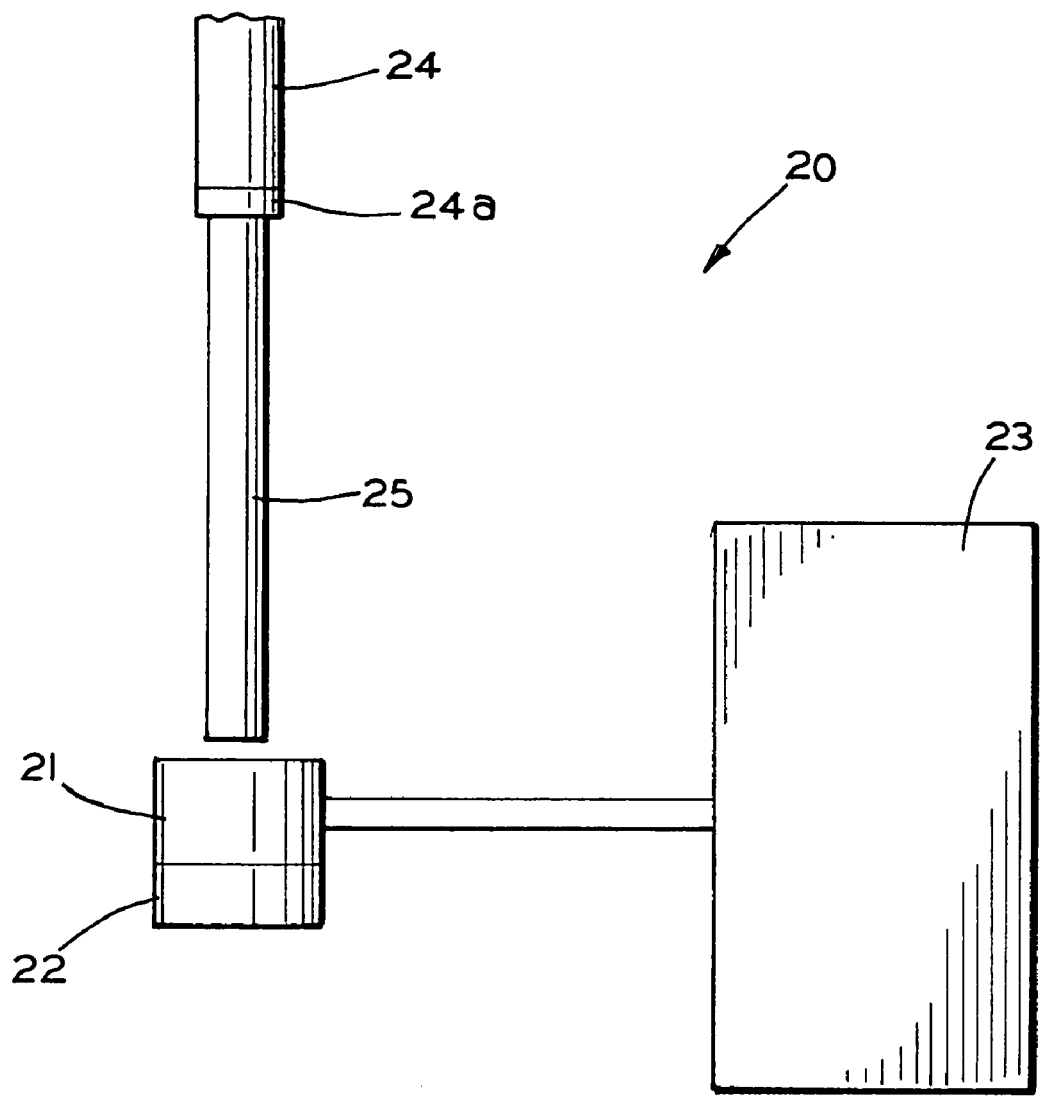
FIG. 2 is a schematic side elevational view of a first embodiment of an apparatus for performing a scanning heat treatment process on a workpiece in accordance with this invention, wherein the workpiece is located at a starting position at the commencement of the scanning heat treatment process.

FIG. 2 is a schematic side elevational view of a first embodiment of an apparatus, indicated generally at 20, for performing the scanning heat treatment process in accordance with this invention. The apparatus 20 includes an annular induction heating coil 21 and an annular water quenching ring 22 that are preferably disposed adjacent to one another, as illustrated. The induction heating coil 21 is conventional in the art and is connected to a control circuit 23 for selectively causing an electrical current to flow therethrough. The operation of the induction heating coil 21 and the quenching ring 22 will be explained further below. The apparatus 20 further includes a support mechanism, a portion of which is illustrated at 24. The support mechanism 24 includes a collet 24a or other mechanism for engaging one end of a workpiece 25. The illustrated support mechanism 24 is structured so as to suspend the workpiece 25 vertically downwardly from the end engaged by the collet 24a, although such is not necessary.

Figure 3:
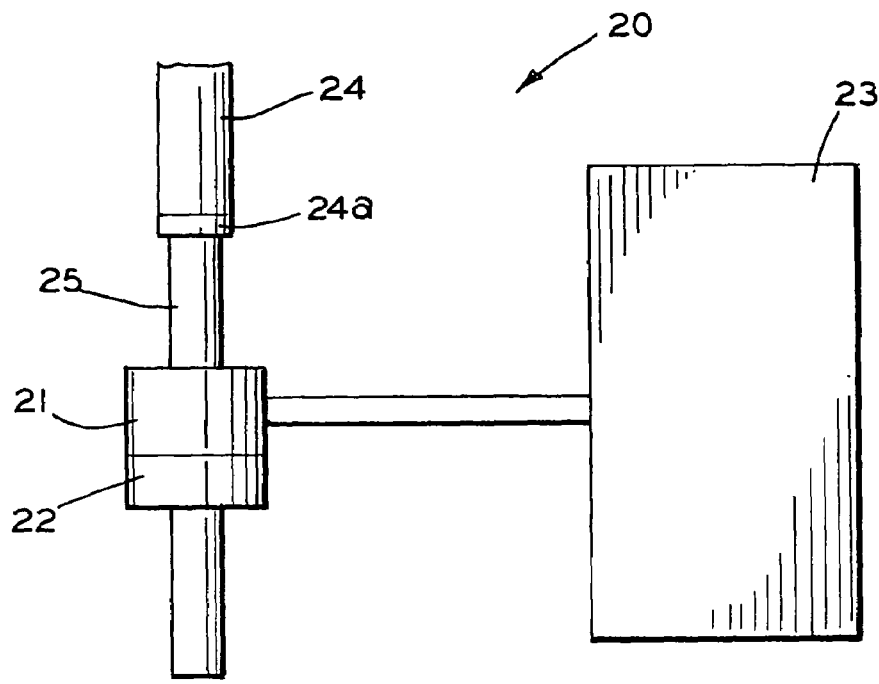
FIG. 3 is a schematic side elevational view similar to FIG. 2 wherein the workpiece is located at an intermediate position during the scanning heat treatment process.
Figure 4:
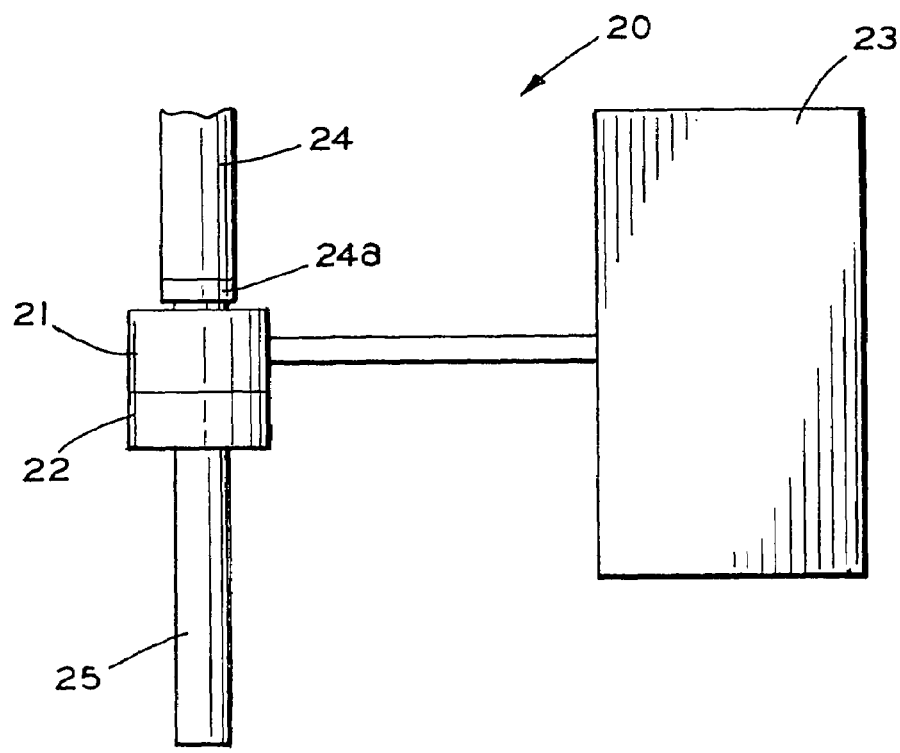
FIG. 4 is a schematic side elevational view similar to FIG. 2 wherein the workpiece is located at an ending position at the conclusion of the scanning heat treatment process.

The locations of the support mechanism 24 and the workpiece 25 at the commencement of the scanning heat treatment process to be performed by the induction heating coil 21 and the quenching ring 22 are illustrated in FIG. 2. As shown therein, the workpiece 25 is initially suspended vertically above the induction heating coil 21 and the quenching ring 22 by the support mechanism 24. Then, the support mechanism 24 is operated to lower the workpiece 25 vertically downwardly through the induction heating coil 21 and the quenching ring 22. As this occurs, an electrical current is passed through the induction heating coil 21 by the control circuit 23. As is well known, when an electrical current is passed through the induction heating coil 21, corresponding electrical currents are induced to flow within the metallic workpiece 25. Because of the internal electrical resistance of the metallic workpiece 25 to the flow of electrical current, these induced electrical currents are converted to heat energy. As a result, the leading end of the workpiece 25 that is initially disposed within the induction heating coil 21 is rapidly heated to an elevated temperature. If desired, other heating structures may be provided in lieu of the inductive heating coil 21. FIGS. 3 and 4 show the support mechanism 24 and the workpiece at subsequent stages of the scanning heat treatment process. In FIG. 3, the support mechanism 24 and the workpiece 25 are located at an intermediate position relative to the heating coil 21 and the quenching ring 22 during the scanning heat treatment process. In FIG. 4, the support mechanism 24 and the workpiece 25 are located at an ending position relative to the heating coil 21 and the quenching ring 22 at the conclusion of the scanning heat treatment process. As is apparent from these drawings, the support mechanism 24 is effective to lower the workpiece 25 longitudinally downwardly through the inductive heating coil 21 such that the workpiece 25 is heated in a continuous and longitudinal manner from the leading end to the trailing end.

As mentioned above, the quenching ring 22 is disposed adjacent to the induction heating coil 21. The quenching ring 22 is also conventional in the art and is provided to rapidly cool the workpiece 25 after it has been heated by the induction heating coil 21. Thus, after the leading end of the workpiece 25 has been moved downwardly through the induction heating coil 21 and rapidly heated, it is immediately moved downwardly through the quenching ring 22, wherein it is rapidly cooled. If desired, other cooling structures may be provided in lieu of the quenching ring 22. Thus, the support mechanism 24 is also effective to lower the workpiece 25 longitudinally downwardly through the quenching ring 22 such that the workpiece 25 is also cooled in a continuous and longitudinal manner from the leading end to the trailing end after being heated.

At the conclusion of the scanning heat treatment process, the workpiece 25 can be released from the collet 24a of the support mechanism 24 and transferred to a transport mechanism (not shown) for delivery to a apparatus for deforming the workpiece 25 in accordance with the third step 13 of the method 10 described above. Preferably, the workpiece 25 is released from the collet 24a without having to be retracted upwardly through the inductive heating coil 21 and the quenching ring 22. However, the workpiece 25 may be retracted upwardly through the inductive heating coil 21 and the quenching ring 22 before being transferred to the transport mechanism if desired.

Accordingly, it can be seen that the scanning heat treatment process is performed on the workpiece 25 in a continuous and longitudinal manner from one end to the other. As mentioned above, the scanning heat treatment process is preferably a retrogression heat treatment process, wherein the workpiece 25 is rapidly heated by the inductive heating coil 21 to a sufficient temperature that provides for full or partial softening thereof, followed by relatively rapid cooling by the quenching ring 22. Notwithstanding this cooling, the workpiece 25 retains the full or partial softening characteristics for at least a relatively short period of time in which the subsequent deforming step 13 of the method 10 described above can be performed.

As mentioned above, the workpiece 25 is preferably supported vertically during the scanning heat treatment process to prevent the shape thereof from becoming distorted. This is because vehicle frame components are frequently relatively long in length and are relatively heavy in weight. If a relatively long and heavy workpiece 25 is suspended horizontally at its two ends during the scanning heat treatment process, it is possible that the central portion thereof may bow downwardly or otherwise distort under the influence of gravity during or after the scanning heat treatment process. By suspending the workpiece 25 vertically during the scanning heat treatment process, the likelihood of such distortions is greatly reduced because the weight of the workpiece 25 is insufficient to cause any significant elongation or other shape distortion thereof.

Figure 5:
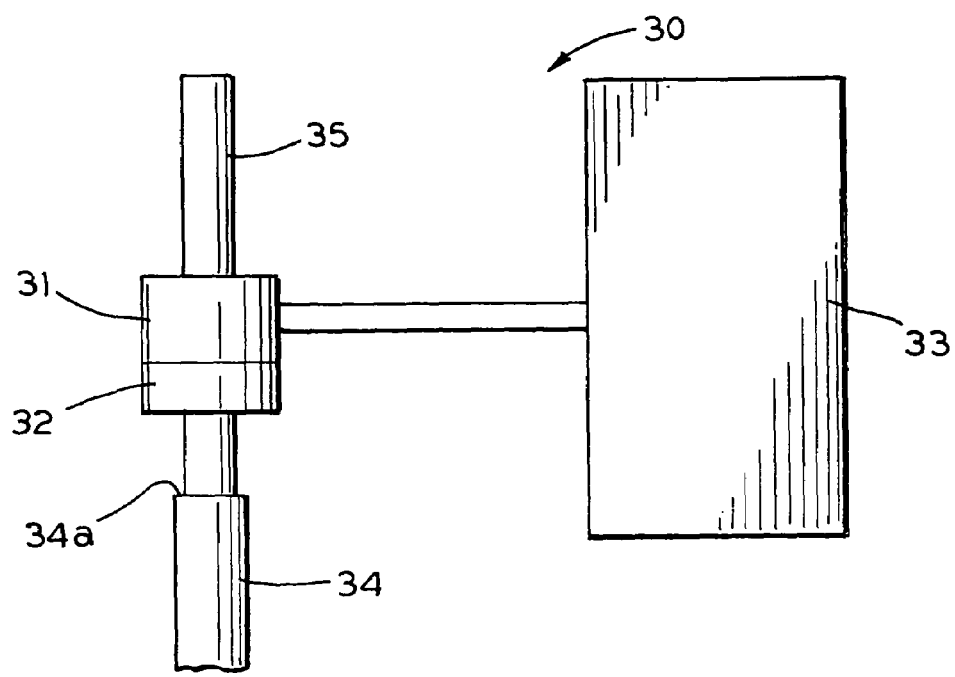
FIG. 5 is a schematic side elevational view of a second embodiment of an apparatus for performing a scanning heat treatment process on a workpiece in accordance with this invention, wherein the workpiece is located at an intermediate position during the scanning heat treatment process.

FIG. 5 is a schematic side elevational view of a second embodiment of an apparatus, indicated generally at 30, for performing the scanning heat treatment process in accordance with this invention. The apparatus 30 includes an annular induction heating coil 31 and an annular water quenching ring 32 that are preferably disposed adjacent to one another, as illustrated. The induction heating coil 31 is conventional in the art and is connected to a control circuit 33 for selectively causing an electrical current to flow therethrough. The operation of the induction heating coil 31, the quenching ring 32, and the control circuit 33 are essentially the same as described above. The apparatus 30 further includes a support mechanism, a portion of which is illustrated at 34. The support mechanism 34 includes an end surface 34a or other engaging mechanism for engaging one end of a workpiece 35. The illustrated support mechanism 34 is structured so as to support the workpiece 35 vertically upwardly from the end engaged by the end surface 34a. The support mechanism 34 functions in a similar manner as the above-described support mechanism 24 to lower the workpiece 35 longitudinally downwardly to perform the scanning heat treatment process.

Figure 6:
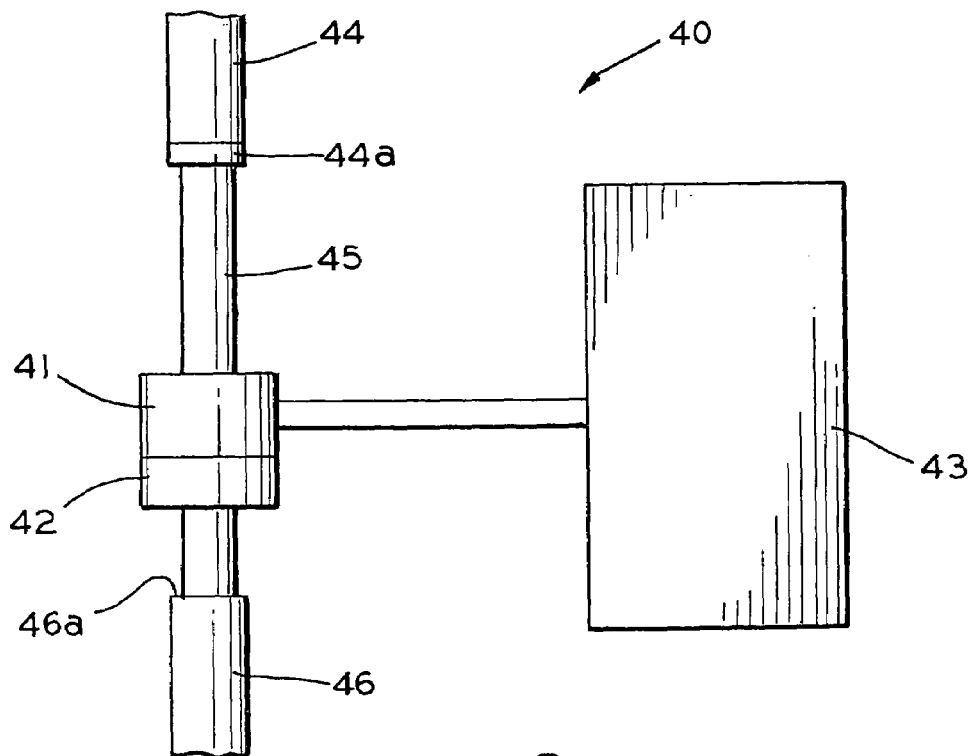
FIG. 6 is a schematic side elevational view of a third embodiment of an apparatus for performing a scanning heat treatment process on a workpiece in accordance with this invention, wherein the workpiece is located at an intermediate position during the scanning heat treatment process.

FIG. 6 is a schematic side elevational view of a third embodiment of an apparatus, indicated generally at 40, for performing the scanning heat treatment process in accordance with this invention. The apparatus 40 includes an annular induction heating coil 41 and an annular water quenching ring 42 that are preferably disposed adjacent to one another, as illustrated. The induction heating coil 41 is conventional in the art and is connected to a control circuit 43 for selectively causing an electrical current to flow therethrough. The operation of the induction heating coil 41, the quenching ring 42, and the control circuit 43 are essentially the same as described above. The apparatus 40 further includes an upper support mechanism, a portion of which is illustrated at 44. The upper support mechanism 44 includes a collet 44a or other engaging structure for engaging an upper end of a workpiece 45 and functions similarly to the support mechanism 24 described above. The apparatus 40 further includes a lower support mechanism, a portion of which is illustrated at 46. The lower support mechanism 46 includes an end surface 46a or other engaging mechanism for engaging a lower end of the workpiece 45 and functions similarly to the support mechanism 35 described above.

The illustrated upper and lower support mechanisms 44 and 46 are structured so as to support the workpiece 45 vertically to lower the workpiece 35 longitudinally downwardly to perform the scanning heat treatment process. This can be accomplished by initially supporting the upper end of the workpiece 45 only by the upper support mechanism 44 and lowering the workpiece 45 partially downwardly through the inductive heating coil 41 and the quenching ring 42. During this initial movement, the lower end of the workpiece 45 is freely movable through the inductive heating coil 41 and the quenching ring 42. When the workpiece 45 has been moved partially through the inductive heating coil 41 and the quenching ring 42, the lower end engages the lower support mechanism 46, and the upper support mechanism 44 is released. Thereafter, the lower support mechanism 46 continues the lowering of the workpiece 45. During this subsequent movement, the upper end of the workpiece 45 is freely movable through the inductive heating coil 41 and the quenching ring 42. Thus, both extreme ends of the workpiece 45 can be fully subjected to the scanning heat treatment process.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of performing a retrogression heat treatment process on a workpiece comprising the steps of:
   (a) providing a workpiece having a first portion and a second portion and defining a length; and
   (b) performing a retrogression heat treatment process on only a portion of the workpiece that is less than the length of the workpiece in a continuous and longitudinal manner from the first portion of the workpiece to the second portion of the workpiece either by (1) supporting an upper end of the workpiece and moving the workpiece vertically relative to an inductive heating coil and quenching ring, by (2) supporting a lower end of the workpiece and moving the workpiece vertically relative to the inductive heating coil and quenching ring, or by (3) initially supporting one of an upper end of the workpiece and a lower end of the workpiece, moving the workpiece vertically relative to an inductive heating coil and quenching ring, and subsequently supporting the other of the upper end and the lower end.

2. The method defined in claim 1 wherein said step (b) is performed by performing the retrogression heat treatment process on the workpiece in a continuous and longitudinal manner from either the upper end of the workpiece to the lower end of the workpiece to the upper end of the workpiece.

3. The method defined in claim 1 wherein said step (b) is performed by providing the inductive heating coil and the quenching ring adjacent to one another.

4. The method defined in claim 1 wherein said step (b) is performed by moving the workpiece downwardly through the inductive heating coil and the quenching ring.

5. The method defined in claim 1 wherein said step (b) is performed by moving the workpiece upwardly through the inductive heating coil and the quenching ring.

6. The method defined in claim 1 including a further step (c) of deforming the scanned portion of the workpiece while the scanned portion of the workpiece remains softened.

* * * * *

UNITED STATES PATENT AND TRADEMARK OFFICE
CERTIFICATE OF CORRECTION

PATENT NO. : 7,028,404 B1 Page 1 of 1
DATED : April 18, 2006
INVENTOR(S) : Jason A. Poirier and Richard A. Marando It is certified that error appears in the above-identified patent and that said Letters Patent is hereby corrected as shown below:

<u>Column 8,</u>
Line 48, after "workpiece" insert -- or from the lower end of the workpiece --.

Signed and Sealed this

Thirteenth Day of June, 2006

JON W. DUDAS
*Director of the United States Patent and Trademark Office*